(12) United States Patent
Green et al.

(10) Patent No.: US 7,187,623 B2
(45) Date of Patent: Mar. 6, 2007

(54) UNDERWATER DATA COMMUNICATION AND INSTRUMENT RELEASE MANAGEMENT SYSTEM

(75) Inventors: Maurice D. Green, North Falmouth, MA (US); Kenneth F. Scussel, East Falmouth, MA (US)

(73) Assignee: Teledyne Benthos, Inc., North Falmouth, MA (US)

( * ) Notice: Subject to any disclaimer, the term of this patent is extended or adjusted under 35 U.S.C. 154(b) by 19 days.

(21) Appl. No.: 11/076,598

(22) Filed: Mar. 10, 2005

(65) Prior Publication Data

US 2005/0213649 A1   Sep. 29, 2005

Related U.S. Application Data

(60) Provisional application No. 60/552,806, filed on Mar. 12, 2004.

(51) Int. Cl.
*H04B 11/00* (2006.01)
(52) U.S. Cl. ...................................... 367/133
(58) Field of Classification Search ............. 367/133, 367/134, 4; 441/2; 375/222
See application file for complete search history.

(56) References Cited

U.S. PATENT DOCUMENTS

| | | | | |
|---|---|---|---|---|
| 3,069,657 A | * | 12/1962 | Green, Jr. et al. | 367/133 |
| 3,742,535 A | * | 7/1973 | Horrer et al. | 441/23 |
| 3,848,226 A | * | 11/1974 | Perez | 367/133 |
| 4,430,552 A | * | 2/1984 | Peterson | 367/133 |
| 5,022,013 A | | 6/1991 | Dalton et al. | |
| 5,701,276 A | * | 12/1997 | Bellini | 367/133 |
| 6,271,767 B1 | | 8/2001 | Frye et al. | |

OTHER PUBLICATIONS

Telesonar Acoustic Modem Brochure (2000), Benthos, Inc., See http://benthos.com/pdf/Modems/telesonar.pdf.

* cited by examiner

*Primary Examiner*—Dan Pihulic
(74) *Attorney, Agent, or Firm*—Francis J. Caufield

(57) ABSTRACT

A data communications and underwater release management system for acquiring data from remote positively buoyant instrumentation packages moored underwater through the use of an intervening mechanical release coupled at one end to the buoyant instrumentation package and at the other to the mooring. A topside modem system provides bidirectional communication with an undersea modem commonly housed with the release to permit data generated from the instrumentation to be conveyed topside and/or send command signals to release the instrumentation package so that it can ascend to the surface for recovery, repair, or refitting. Power is supplied via an on-board battery whose energy level is monitored and directed when below a threshold value to operate only the mechanical release.

15 Claims, 8 Drawing Sheets

FIG. 4

| FILE DEPLOYMENT ACOUSTIC COMM. CONFIG. DATALOGGER FILE TRANSFER DIAG. HELP |

ACOUSTIC BAUD RATE
DOWNLINK  2400  ◁▷  SET  MAX
UPLINK    2400       MAX
          10240 ◁▷  SET
          15360     MAX

REMOTE ID              ◁▷  SET
LOCAL POWER LEVEL  FULL ◁▷ SET
REMOTE POWER LEVEL -3DB ◁▷ SET

RELATIVE SPEED  [    ] KTS.
RANGE           [    ]

BATTERY VOLTAGE
LOCAL    REMOTE
20.0V    20.0V

REMOTE DATALOGGER
EMPTY ▬▬▬▬▬▬▬▬▬▬ FULL

SIGNAL  LOW ▬▬▬▬ HIGH
NOISE   LOW ▬▬▬▬ HIGH

TERMINAL

***

INPUT

| COM1 | ONLINE | LOW FREQ BAND | CAPTURE DEF | 10/22/2002 | 2:44PM |

| REMOTE MODEM CONFIGURATION | |
|---|---|
| MODEM SOFTWARE VERSION (S0) | 4.2 |
| MAX ACOUSTIC RECEIVE BAUD RATE (S9) | 2400 BITS/SEC |
| MODEM ID (S18) | |
| REMOTE MODEM ID (S14) | |
| DOPPLER CORRECTION (S1) | OFF |
| ACOUSTIC TRANSMIT BAUD RATE (S4) | 2400 BITS/SEC |
| TRANSMIT POWER LEVEL (S6) | -21DB |
| ACOUSTIC RESPONSE TIMEOUT (S7) | 2625 M |
| FORWARDING DELAY (S8) | 3.00 SEC |
| IDLETIME (S10) | 280 SEC |
| TOTAL PACKET SIZE (S12) | 256 BYTES |
| VERBOSE LEVEL (S13) | STANDARD |
| OPERATING MODE (S15) | ONLINE |
| LOW POWER WAKEUP (S17) | ON |

[FACTORY RESET] [SERIAL PORT] [SET] [ADVANCED]

FIG. 5A

ADVANCED MODEM SETTINGS

BANDWITH
○ FULL
○ HALF
○ NON-STANDARD

FREQUENCY BAND
○ HF (25-30KHZ)
○ MF (16-21KHZ)
○ LF (9-14KHZ)
○ NON-STANDARD

[SET]

FIG. 5B

UNDERWATER DATA COMMUNICATION AND INSTRUMENT RELEASE MANAGEMENT SYSTEM

CROSS REFERENCE TO RELATED APPLICATION

This application claims the benefit of priority from U.S. Provisional Patent Application No. 60/552,806 filed on Mar. 12, 2004 and entitled UNDERWATER DATA COMMUNICATION AND INSTRUMENT RELEASE MANAGEMENT SYSTEM, the entire contents of which are incorporated herein by reference.

FIELD OF THE INVENTION

This invention generally relates to apparatus and methods for underwater communication and, more particularly, to apparatus and methods by which data can be acquired by a topside unit from an instrument package remotely located underwater and/or the instrument package can be released by command from the topside unit.

BACKGROUND OF THE INVENTION

With packages moored below or beneath the surface of water, it is desirable to have a remotely controlled release mechanism for disengaging the packages from their moorings thus allowing them to rise to the surface for retrieval or to sink below toward the bottom. Such apparatus have commonly been used with subsea data collecting instruments, especially where such instruments are anchored at significant depths. Such instruments are typically connected to or integrated with a flotation device. At shallow depths, the flotation device may be kept at the surface for easy retrieval by surface vessels. When the submerged package is at more significant depths or it is desired that the submerged package not be easily sighted at the water surface, it is typical to secure the package and flotation device completely below the water by attaching it to a mooring via an intermediate, acoustically triggered, release.

Prior release mechanisms have been remotely triggered with acoustic communications devices using narrowly limited and discrete sets of signals. For instance, a typical device might accommodate a few discrete frequencies that, when detected by the release mechanism, cause it to disengage from the mooring apparatus and allow the disconnected package to float to the surface for retrieval.

Another desirable feature to have with underwater packages is the ability to transfer large amounts of data between them and the surface while such packages remain submerged. There are currently available advanced apparatus and methods for communicating large amounts of voice and other data through water, facilitated by what are typically referred to as underwater modems. These underwater modems generally provide the same functionality as those commonly used for global network communications across telephone, microwave, radio and other mediums. Underwater modems currently provide a dynamic means for high-rate data transfer between land, above-water and underwater vessels, and instruments such as those used for collecting information about undersea conditions.

Thus, current practice is to use multiple communications links and protocols from surface to sub sea units to retrieve data from undersea packages, communicate with their various components, and issue commands to release mechanisms. These practices are redundant and result in inefficient and costly apparatus comprised of multiple battery/power sources and communications instruments both below and above the surface.

Consequently, there is a need to be able to efficiently and effectively acquire data from submerged instrument packages and also release them from their underwater moorings for retrieval, and it is a primary object of the present invention to address this need.

Other objects of the invention will, in part, appear hereinafter and, in part, be obvious when the following detailed description is read in connection with the drawings.

SUMMARY OF THE INVENTION

The present invention is directed to an underwater data communications and instrument package release management system and associated method. The present invention comprises a release and an underwater modem apparatus integrated in a single waterproof housing having one-end adapted to be releasably attached to an underwater mooring and the other preferably attached to a buoyant instrumentation package. The modem is adapted for bi-directional communications and for providing a means for controlling and monitoring the release apparatus. The modem also is adapted for receiving and transmitting complex data and commands to and from attached instruments.

An embodiment of the invention includes a cylindrical housing to permit safe enclosure of a release mechanism and acoustic modem at significant underwater depths. At one end, the housing includes a means releasably latching to an attachment, the attachment typically being part of a means for tethering and anchoring the housing and combined loads to the seafloor. Also within the housing is included the acoustic modem, a processing unit for interpreting and directing commands and data between the modem and other components, and a long-life battery. The processing unit includes a means for connecting with internal or external instruments. Instruments can alternatively be contained within the housing or attached externally via a tethering arrangement. External instruments typically are electrically connected to interior housing components using water-sealed or sealable communication wires and ports. Data gathering instruments can be stored within positively buoyant spheres and, while the sphere is secure to the housing of the release, the instruments are wired to the processor and modem components of the invention. This avoids the necessity of having a modem component within or integrally combined with the spheres or their internal instruments.

Various embodiments of acoustic underwater modems can be selected for adaptation with the invention. Many such modems are sold by Benthos, Inc., North Falmouth, Mass., including acoustic modems for either shallow-water or deep-water use and those that use various data transmission modes. Incorporated within these modems are features designed to accommodate the dense and irregular medium of seawater. Such modems adopt various known techniques for signal modulation such as Frequency Shift Keying (FSK) or Phase Shift Keying (PSK), including various known adaptations of these techniques such as Multiple Frequency Shift Keying (MFSK) or Multi-byte Phase Shift Keying (MPSK). Typically included are Doppler correction techniques to compensate for signal distortion created by motion between transmitters and receivers. The transmitters of these modems can alternatively be adapted for directional or omni-directional radiation. These modems also may be adapted with many of the features that today's standard telephony-based modems include, such as data compression, buffering, and/or error correction.

One embodiment of the modem component would include a processing unit for directing data and commands between the modem and various instruments, including the release mechanism. A wide variety of microprocessors and micro-controllers are available that can readily be programmed for such use.

For use as a surface communication means with the underwater modem, a portable surface component may be provided with a dunkable transducer. This component is typically employed on a surface vessel with the dunkable transducer towed or otherwise resident beneath the water surface. The surface component contains its own underwater modem component that acts to transmit and receive data to and from other underwater remotely located modems. The surface component provides a means for storing and transferring such data to and from other various surface components, such as a personal computer ("PC") via an RS-232 port or other communications means.

An embodiment of a surface unit can be adapted for use with common or customized software packages that are installable on personal computers (including laptops). This software is adapted to act as an interface for an operator to transmit data and commands to control the release mechanism and other various instruments connected to an underwater modem. The software may also be used to receive, present and store data retrieved through the modem.

BRIEF DESCRIPTION OF THE DRAWINGS

The structure, operation and methodology of the invention, together with other objects and advantages thereof, may best be understood by reading the detailed description in connection with the drawings in which each part has an assigned label or numeral that uniquely identifies it wherever it appears in the various drawings and wherein:

FIG. 4 is a view of a main screen for an embodiment of the computer software component of the present invention;

FIGS. 5A and 5B are views of software screens for configuring the modem component of the present invention;

DETAILED DESCRIPTION

Figure 1:
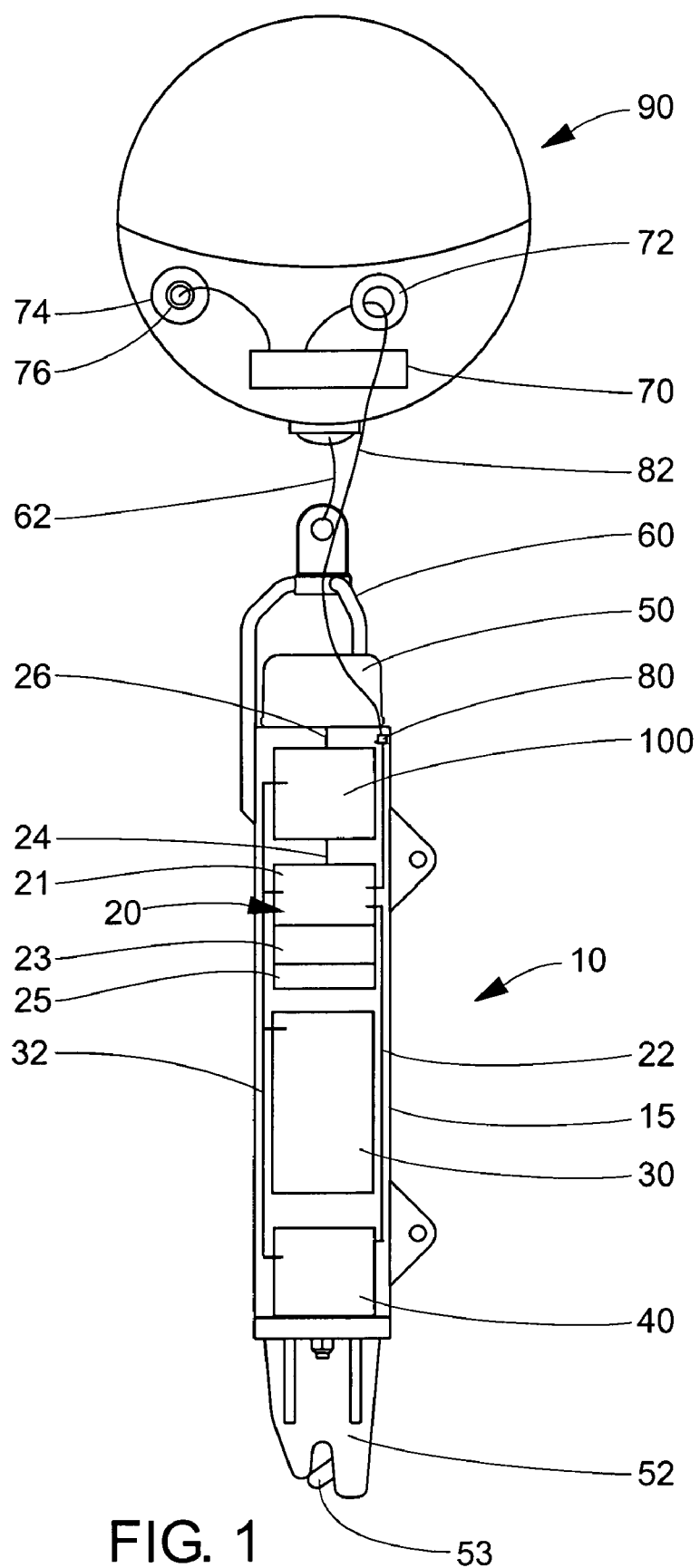
FIG. 1 is a diagrammatic side elevational view showing in block form an underwater data communications and instrument release according to an embodiment of the invention connected to a spherical float-instrument package.

Reference is now made to FIG. 1, which illustrates an underwater release 10 that comprises part of the data communications and instrument release management system of the invention. Underwater release 10 includes a variety of internal components that reside in a protective, preferably cylindrical, waterproof housing 15 including a release mechanism 40 adapted to mechanically actuate a latch assembly 52 to which an underwater load, such as an anchoring or mooring means can be attached. To the top end of underwater release 10 is attached a spherical instrument package 90 that has positive buoyancy. Instrument package 90 is attached to underwater release 10 via a cable 62.

Also residing in housing 15 is a modem 100 that serves to provide communications between underwater release 10 and a topside or surface base unit. Modem 100 connects via cabling 24 to a controller unit 20. Controller unit 20, which comprises a controller board 21, CPU 23, and memory 25, interprets and translates commands and data to and from instruments 70 that are located in instrument package 90 and release mechanism 40, including commands for actuating release mechanism 40. A long-life battery 30 provides power for modem 100, controller unit 20 and release mechanism 40. Controller unit 20 is preferably programmed to monitor the power level of battery 30, so that when power levels fall below a predetermined threshold, instruments and other components are turned off and only commands for "waking" the modem to actuate the release mechanism 40 are processed by controller board 20. Modem 100 connects to an external transmitter/receiver or transducer 50, which delivers and receives acoustic signals to and from other transmitters and receivers. Transmitter/receiver 50 is partially protected from external physical interference by caged housing shield 60. Power may also be provided by an external battery pack or by an undersea generator.

As mentioned earlier, underwater release 10 is connected to spherical float/instrument package 90 via underwater tethering means 62 selected from among many strong and corrosive-resistant type materials that are available for this purpose. Controller board 20 is connected to an external communications interface 80, selected from among any suitable water-shielded multi-pin variations commercially available. Interface 80 connects to an underwater cable 82 that, in turn, connects to a data port 72 to provide a communications link between modem 100 and instruments 70. A sensor port 74 provides a means for a sensor 76 to access and collect data from the surrounding undersea environment. Within float/instrument package 90 is a sufficient vacuum to assist in providing the necessary sealing force for keeping its two hemispherical halves together. Seawater displacement causes instrument package 90 to be buoyant thereby allowing it and underwater release 10 to ascend to the surface when release mechanism 40 is detached from its underwater mooring.

Figure 2:
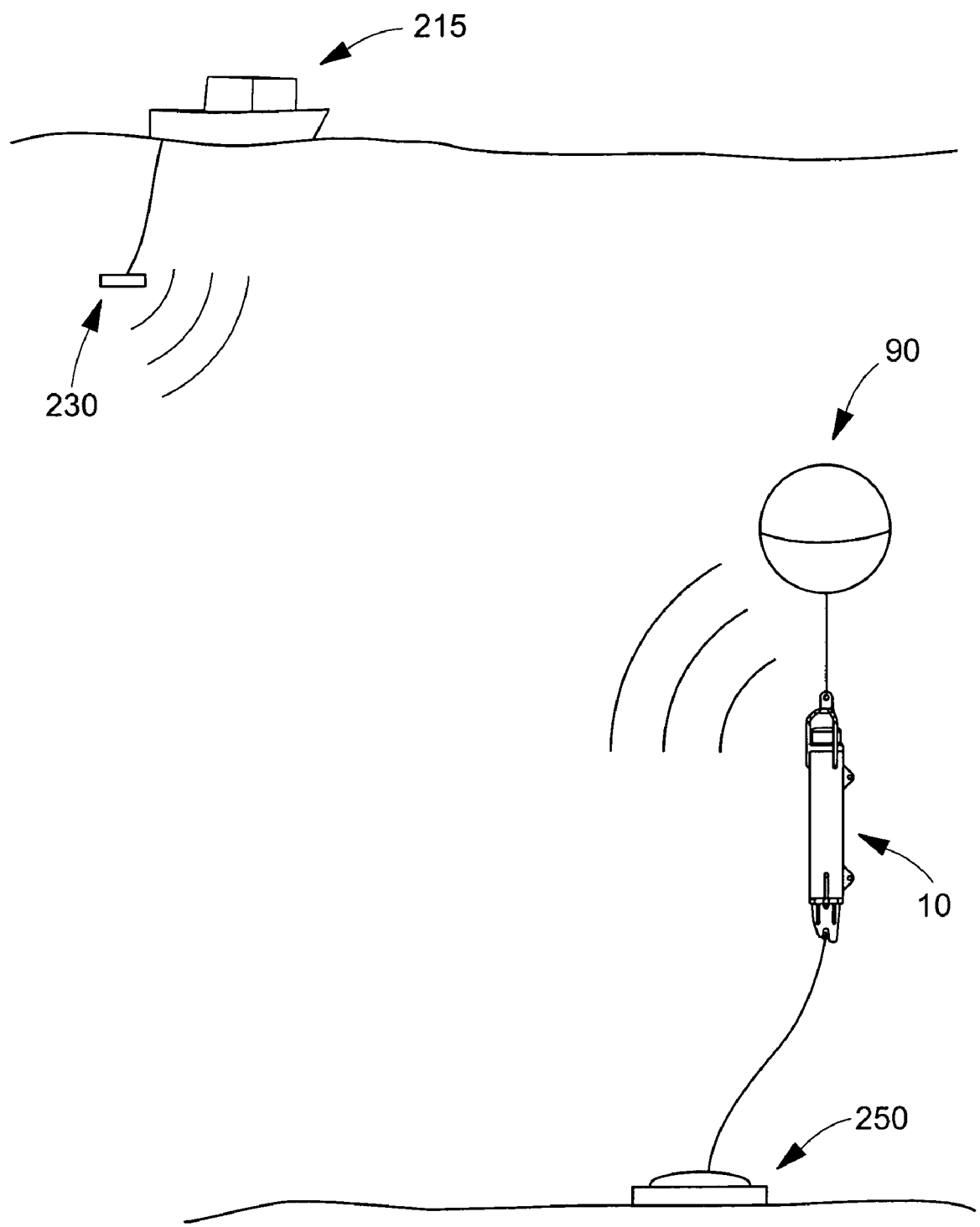
FIG. 2 is a diagrammatic view illustrating the underwater data communications and instrument release management system according to an embodiment of the present invention as it is deployed.
Figure 3:
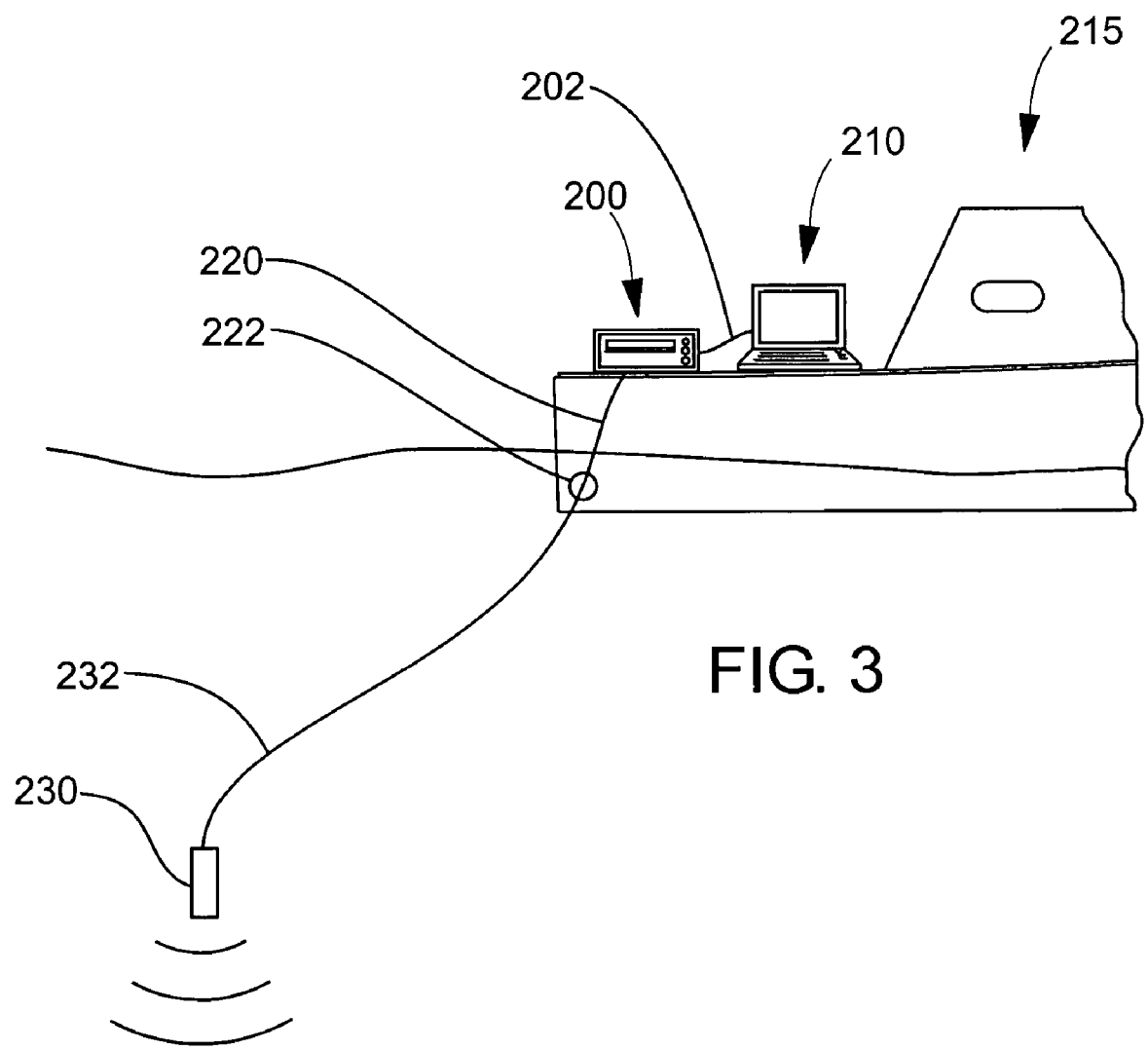
FIG. 3 is a diagrammatic side view of the top-surface components according to an embodiment of the present invention as shown in FIG. 2.

Reference is now made to FIGS. 2 and 3, which diagrammatically show the underwater data communications and instrument release management system of the invention deployed in its native operating environment. A top surface or topside modem 200 (FIG. 3) and its components are transported and alternatively powered by seagoing vessel 215. Towed below seagoing vessel 215 is transducer 230 that provides a means for transmitting and receiving underwater acoustic signals to and from other acoustic underwater remotely located devices such as underwater release 10.

Underwater release 10 is shown tethered to spherical float/instrument package 90 and held below the surface by a mooring 250.

Reference is now made to FIG. 3, which shows a side elevational view of the top surface components of the invention as they are deployed in FIG. 2. Topside modem 200 connects to underwater transducer 230 via a cable 220 or alternatively via a port 222, and underwater cable 232. Underwater transducer 230 provides a means for transmitting and receiving underwater acoustic signals to other underwater modems, similar to that shown in FIG. 2. Topside modem 200 can provide its own integrated operator interface or alternatively be remotely managed by a separate computer 210, which can be connected to modem 200 by various available means such as cable 202. Cable 202 could, for example, be terminated by various types of connectors including RS-232, Ethernet, and USB. Modem 200 and computer 210 may alternatively be connected by wireless means such as wireless Ethernet.

Reference is now made to FIG. 4, which shows an embodiment of the main screen of a software component of the invention, which resides in computer 210. The main screen provides a graphical user interface (GUI) for initializing communications between topside and underwater modems, automating desired sequences of communications between such modems, allowing basic commands to be transmitted between modems via a terminal window, and providing a means for retrieving various diagnostic parameters of modems, such as baud rate, power level, and signal strength. The Main Screen provides a user access to the various other specific functions and screens of the software, such as diagnostic screens (See FIGS. 5A–5B), instrument communication and data viewing screen (See FIG. 6), and underwater release status and control display screen (See FIG. 7).

Reference is now made to FIGS. 5A and 5B, which show configuration screens for topside and underwater modems allowing a user to set operating modes such as maximum baud rate, timeouts, packet sizes, wakeup parameters, bandwidth, and transmission frequencies.

Figure 6:
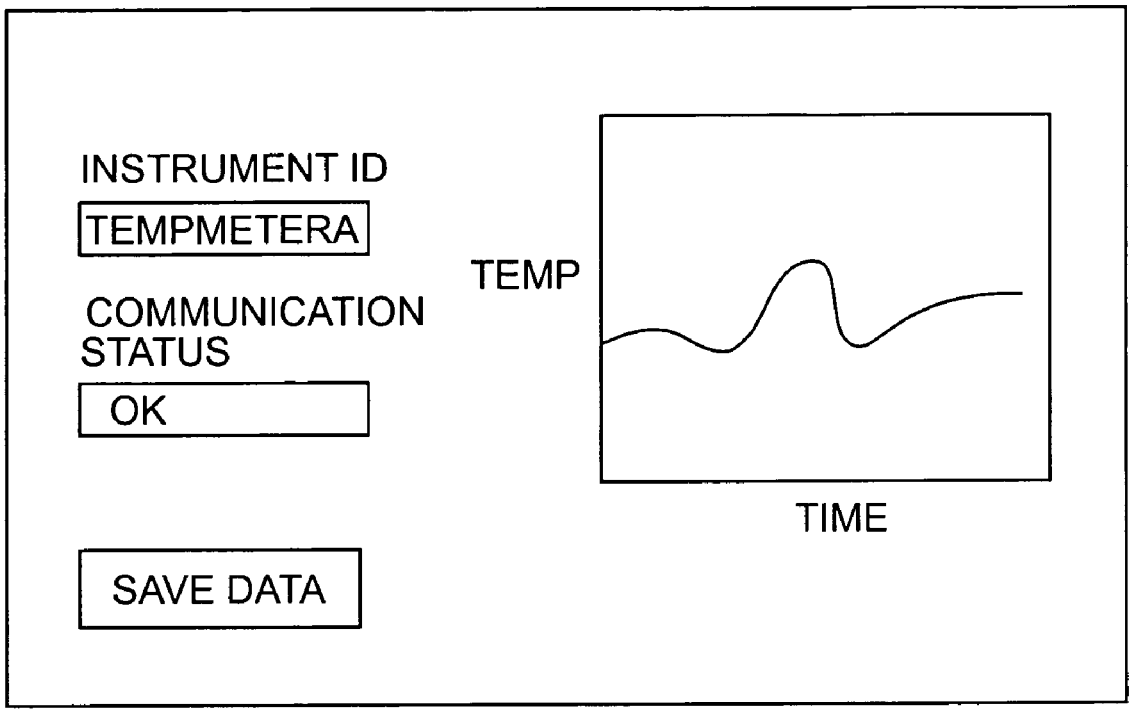
FIG. 6 is a view of a software screen that graphically displays data communicated from instruments attached to underwater modems.

Reference is now made to FIG. 6, which shows an embodiment of a screen for displaying and transferring instrument data and checking an instrument's communications status. Information such as temperature, depth, salinity, current strength, and positional data can be displayed.

Figure 7:
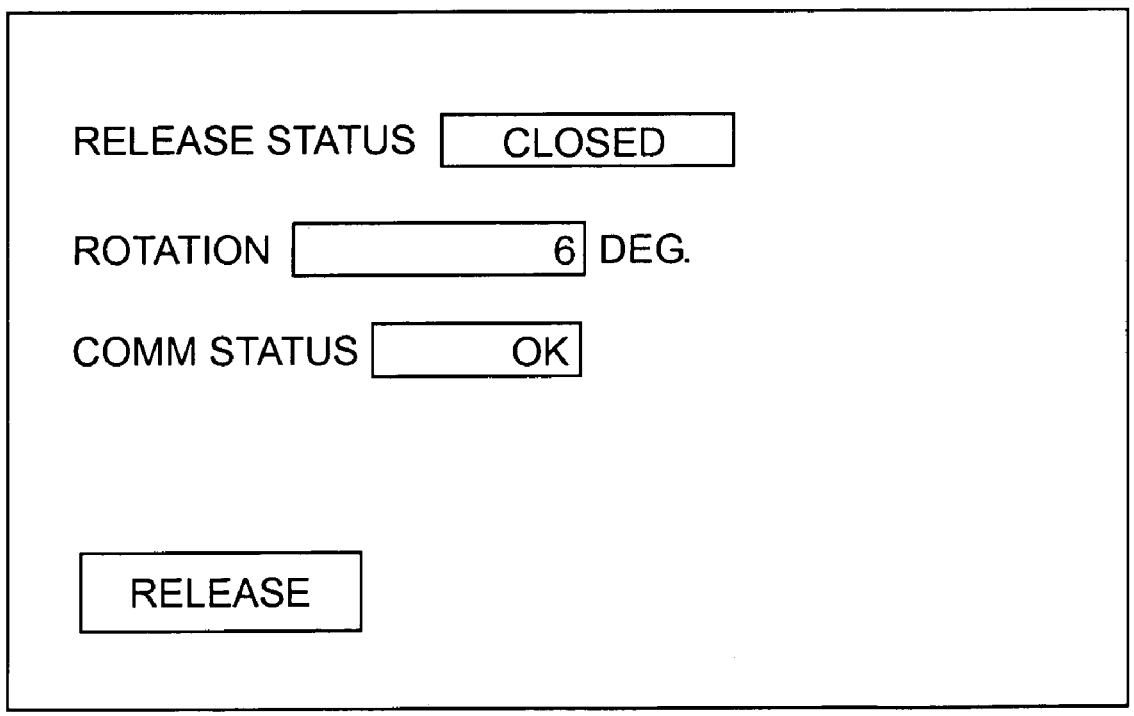
FIG. 7 is a view of a software display screen for remotely controlling and monitoring the status of the release mechanism component of the present invention.

Reference is now made to FIG. 7, which shows an embodiment of a screen for viewing the status of a release mechanism and providing a means for an operator to remotely actuate the release. This screen also permits attitude information about the underwater release to be conveyed.

Software for generating the foregoing screens and other functions may be implemented in well-known manners in any suitable computer language.

Figure 8:
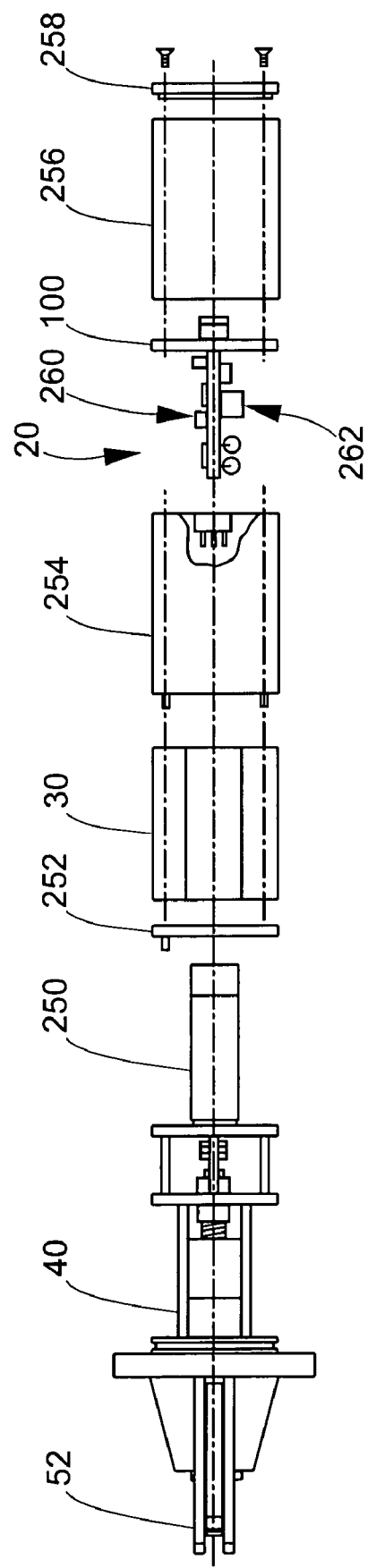
FIG. 8 is a diagrammatic exploded view showing in more detail an embodiment of the internal components of the modem and release apparatus.
Figure 9A:
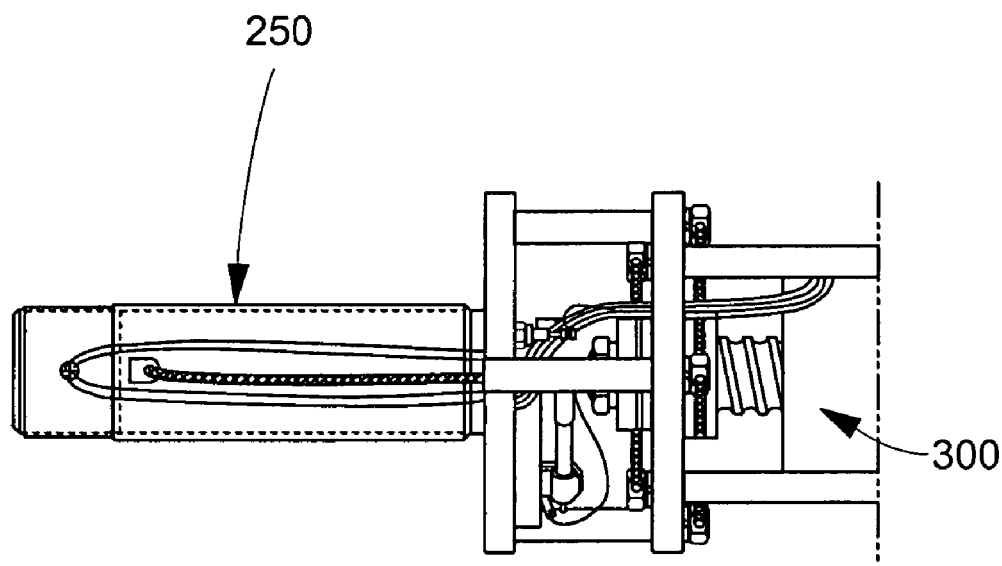
FIG. 9A is a diagrammatic side elevational view of an actuating release mechanism according to an embodiment of the invention; and, FIG. 9B is a diagrammatic elevational view of a release latch that is actuated by the mechanism shown in FIG. 9A.
Figure 9B:
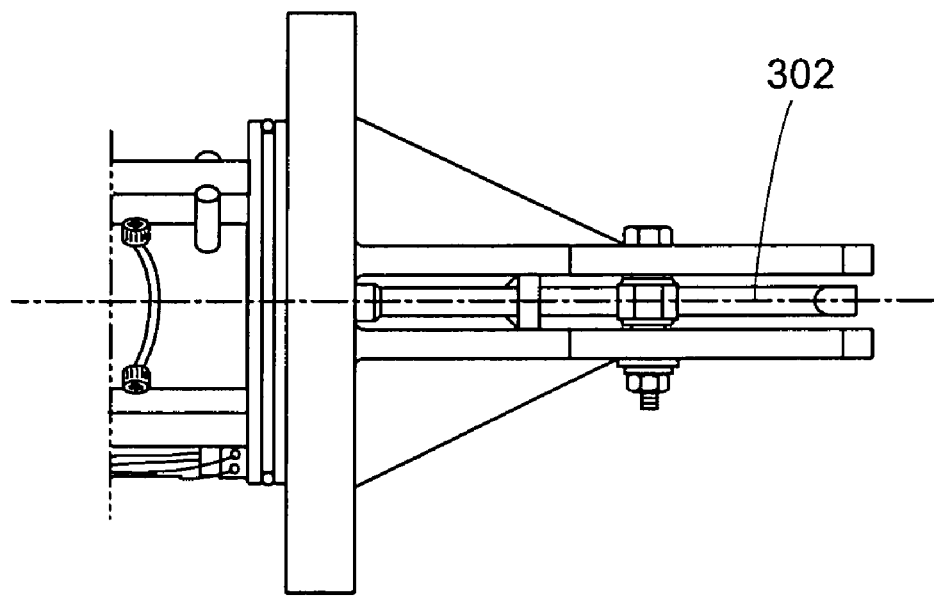

Reference is now made to FIG. 8, which shows an exploded and further detailed diagrammatic variation of a subassembly of the modem and release components packaged for easy insertion into waterproof housing 15 according to an embodiment of the invention. As best seen in FIG. 8, the end cap assembly 52 including modem release mechanism 40 attach to the remaining elements via a chassis connector 250. A battery tube 254 receives battery 30 and is held in place via a battery pack cover plate 252. An electronics tube 256 is adapted to receive controller board 20, and an end plate 258 covers the outboard end of the electronics tube 256. FIG. 8 demonstrates in particular a variation of how the controller unit 20 and modem 100 components can be arranged within the apparatus housing, wherein labeled P.C. boards 260 and 262, can alternatively comprise and/or combine each of said controller and modem components. The end cap assembly 52 along with the elements of the release mechanism 40 complete the other end of the subassembly. Release mechanism 40 comprises a motor driven screw and push rod arrangement 300 shown in FIG. 9A that operates a pivoting latch member 302 shown in FIG. 9B.

The modems of the invention adopt various known communications protocols or techniques for signal modulation such as Frequency Shift Keying (FSK) or Phase Shift Keying (PSK), including various known adaptations of these techniques such as Multiple Frequency Shift Keying (MFSK) or Multi-byte Phase Shift Keying (MPSK). Typically included are Doppler Correction techniques to compensate for signal distortion created by motion between transmitters and receivers. The transmitters of the modems can alternatively be adapted for directional or omni-directional radiation. The modems also may be adapted with many of the features that today's standard telephony-based modems include, such as data compression, buffering, and/or error correction. Preferably included in the communications protocol to improve data transmission are:

1 of 4 MFSK: An advanced modulation scheme, which allows for high speed data transmission (up to 2400 baud). 1 of 4 MFSK is bandwidth efficient, fast and relatively simple to encode.

Hadamard MFSK: An advanced modulation scheme used to minimize the effects of frequency dependent fading. This scheme also allows the system to operate at a lower signal to: noise ratio (SNR) by working reliably at lower transmit power levels.

In addition to 1 of 4 MSFK and Hadamard MFSK, the acoustic modems incorporate three other methods for increased data reliability. These include data redundancy, convolutional coding and a multipath guard period. All three methods are user selectable and can be applied when using either modulation scheme.

Data Redundancy: A technique in which the same data bits are transmitted two or more times (user selectable) in the same data frame. Data reliability is increased through repetition and frequency diversity.

Convolutional coding: An error correction technique in which a Viterbi algorithm is implemented to detect and correct received bit errors. An effective technique for use in high multipath environments. This feature allows the user to incorporate a selectable delay period between data frames. This brief delay allows time for the multipath to die down in the communication channel before sending out the next data frame.

Customer Selectable Frequency Range: The system can be configured to operate within one of three standard frequency ranges: 9–14 kHz (LF), 15–20 kHz (MF), and 25–30 kHz (HF).

Customer Selectable Transducer Arrays: Each of the acoustic modems (topside and sub sea) can be configured to include a directional, omni directional, or line array transducer.

An embodiment of the modem component would include a processor for directing data and commands between the modem and various instruments, including the release mechanism. A wide variety of microprocessors and microcontrollers are available that can readily be programmed for such use or a general-purpose desktop or laptop computer, preferably ruggedized, can be programmed. The software resident in such microprocessors or computers can be implemented using any suitable language, including but not limited to, C, C++, Fortran, Visual Basic, assembler language or combinations thereof.

Based on the disclosure of the invention, other variants of it will be evident to those skilled in the art. For example, it should be apparent that the system can be used without a separate buoyant instrument package since it can be used separately a just a communication and release apparatus. When used without a separate buoyant instrument package, it should be apparent that buoyancy needs to be added if the apparatus is to be to ascend to the surface after release. Such buoyancy can be provided by integrating it with the apparatus housing or attaching is as an external component to an attachment arrangement provided on the housing. The buoyancy could in either case be inflatable. It is intended that such variants be within the scope of the claimed subject matter.

What is claimed is:

1. An underwater wireless data communications and release management system for acquiring data from remote positively buoyant instrumentation packages moored underwater, said system comprising:
   a topside modem having a transducer adapted to be submerged beneath the surface for transmitting and receiving data and commands via underwater signals;
   a buoyant instrumentation package for gathering information about its surrounding environment once submerged;
   a waterproof housing having one end adapted to attach to said buoyant instrumentation package and another to be releasably attached to an underwater mooring; and
   a remote modem and release system resident at least in part in said waterproof housing, said topside and remote modems being configured and arranged with respect to one another for bi-directional wireless communication of data, status signals, and release commands so that data from said instrumentation package can be sent topside via said remote modem and commands from said topside modem can be sent to said release system via said remote modem to separate said instrumentation package from said mooring so that is ascends to the surface along with said waterproof housing and its contents.

2. The system of claim 1 further comprising:
   a storage battery resident in said waterproof housing to supply electrical power to said remote modem and release system; and
   means for monitoring the status of the energy level of said storage battery and directing said release system to operate only in the event that said energy level drops below a predetermined threshold value.

3. The system of claim 1 wherein said modems thereof communicate to one another via communications protocols selected from the group comprising FSK, PSK, MFSK, MPSK, 1 of 4 MSFK and Hadamard MFSK.

4. The system of claim 3 wherein said communications protocols further include the use of data redundancy, convolutional coding, and Doppler compensation.

5. An underwater wireless communications and release management system, said system comprising:
   a topside modem having a transducer adapted to be submerged beneath the surface for transmitting and receiving data and commands via underwater signals;
   a waterproof housing having one end adapted to releasably attach to an underwater mooring;
   a buoyancy arrangement for making said waterproof housing ascend to the surface when released;
   a remote modem and release system resident at least in part in said waterproof housing, said topside and remote modems being configured and arranged with respect to one another for bi-directional communication of data and release commands so that information can be sent topside via said remote modem and commands from said topside modem can be sent to said release system via said remote modem to completely separate said waterproof housing and said remote modem and release system from said mooring.

6. An underwater communications and release apparatus, said apparatus comprising:
   a waterproof housing having one end adapted to releasably attach to an underwater mooring; and
   a remote modem and release mechanism resident at least in part in said waterproof housing, said remote modem being configured and arranged for bi-directional communication of information and release commands so that information can be sent to one or more other modems via said remote modem and commands from one or more other modems can be sent to said release mechanism via said remote modem to separate said apparatus from said mooring,
   wherein said modems thereof communicate to one another via communications protocols selected from the group comprising FSK, PSK, MFSK, MPSK, 1 of 4 MSFK and Hadamard MFSK and further include the use of data redundancy, convolutional coding, and Doppler compensation.

7. The system of claim 5 wherein said waterproof housing further includes means for attaching items to it.

8. The system of claim 7 wherein said buoyancy arrangement comprises a float connected to said housing via said attachment means.

9. The system of claim 5 wherein said buoyancy arrangement is integrated with said waterproof housing.

10. An underwater wireless communications and release apparatus, said apparatus comprising:
    a waterproof housing having one end adapted to releasably attach to an underwater mooring;
    an buoyancy arrangement integrated with said waterproof housing for making said waterproof housing ascend to the surface when released; and
    a remote modem and release mechanism resident at least in part in said waterproof housing, said remote modem being configured and arranged for bi-directional communication of information and release commands so that information can be sent to one or more other modems via said remote modem and commands from one or more other modems can be sent to said release mechanism via said remote modem to separate said apparatus from said mooring so that it floats to the surface completely free of said mooring.

11. The system of claim 10 further comprising:
    a storage battery resident in said waterproof housing to supply electrical power to said remote modem and release system; and
    means for monitoring the energy level of said storage battery and directing said release system to operate only in the event that said energy level drops below a predetermined threshold value.

12. The system of claim 10 wherein said modems thereof communicate to one another via communications protocols selected from the group comprising FSK, PSK, MFSK, MPSK, 1 of 4 MSFK and Hadamard MFSK.

13. The system of claim 12 wherein said communications protocols further include the use of data redundancy, convolutional coding, and Doppler compensation.

14. The system of claim 10 further including an integrated buoyancy arrangement for making said system ascend to the surface when released.

15. An underwater data communications and release management system for acquiring data from remote positively buoyant instrumentation packages moored underwater, said system comprising:
   a topside modem having a transducer adapted to be submerged beneath the surface;
   a buoyant instrumentation package for gathering information about its surrounding environment once submerged;
   a waterproof housing having one end adapted to attach to said buoyant instrumentation package and another to be releasably attached to an underwater mooring; and
   a remote modem and release system resident at least in part in said waterproof housing, said topside and remote modems being configured and arranged with respect to one another for bi-directional communication of data and release commands so that data from said instrumentation package can be sent topside via said remote modem and commands from said topside modem can be sent to said release system via said remote modem to separate said instrumentation package from said mooring so that is ascends to the surface along with said waterproof housing and its contents,
   wherein said modems thereof communicate to one another via communications protocols selected from the group comprising FSK, PSK, MFSK, MPSK, 1 of 4 MSFK and Hadamard MFSK and further include the use of data redundancy, convolutional coding, and Doppler compensation.

* * * * *